United States Patent [19]

Hwa et al.

[11] Patent Number: 5,096,595

[45] Date of Patent: Mar. 17, 1992

[54] CONTROL OF SCALE IN AQUEOUS SYSTEMS USING CERTAIN PHOSPHONOMETHYL AMINE OXIDES

[75] Inventors: Chih M. Hwa, Palatine; John A. Kelly, Crystal Lake, both of Ill.; Janet Neton, West Chester, Ohio; Patricia M. Scanlon, Arlington, Mass.; Roger R. Gaudette, Hudson, N.H.

[73] Assignee: W. R. Grace & Co.-Conn., New York, N.Y.

[21] Appl. No.: 653,476

[22] Filed: Feb. 11, 1991

Related U.S. Application Data

[63] Continuation of Ser. No. 451,681, Dec. 15, 1989, abandoned.

[51] Int. Cl.$^5$ .............................. C02F 1/00; C02F 5/10
[52] U.S. Cl. .................................. 210/700; 252/180; 252/181; 252/175; 210/699
[58] Field of Search .................. 252/80, 81, 175, 180, 252/181; 556/18, 19; 562/12, 13; 210/697, 698, 699, 700

[56] References Cited

U.S. PATENT DOCUMENTS

| | | | |
|---|---|---|---|
| 2,964,549 | 12/1960 | Ramsey et al. | 556/19 |
| 3,214,454 | 10/1965 | Blaser et al. | 556/18 |
| 3,336,221 | 8/1967 | Ralston | 252/82 |
| 3,429,914 | 2/1969 | Crutchfield et al. | 252/117 |
| 3,474,133 | 10/1969 | Crutchfield et al. | 562/12 |
| 3,483,178 | 12/1969 | Crutchfield | 252/136 |
| 4,216,163 | 8/1980 | Sommer et al. | 562/13 |

OTHER PUBLICATIONS

"Cyclishe Intramolekulare Ester von Athanolamin-N-methylenphosphonsauren"; Worms et al.; Zeitschrift fur Anorganische und Allgemeine Chemie, Band 381, 1971; pp. 260-265.
"The Direct Synthesis of α-Amino-Methylphosphonic Acids"; Moedritzer et al.; Mannich-Type Reactions with Orthophosphorous Acid, May 1966; pp. 1603-1607.
"Hydrogen Peroxide Oxidation of Tertiary Amines"; Hoh et al.; Journal of the American Oil Chemists' Society, Jul. 1963 Issue, vol. LV, No. 7, pp. 268-271.
"Recent Advances in Fatty Amine Oxides. Part I. Chemistry and Preparation"; Lake et al.; Journal of the American Oil Chemists' Society, Nov. 1963 Issue, vol. 40, No. 11, pp. 628-631.
"Analysis of Reaction Mixtures from the Hydrogen Peroxide Oxidation of Dimethyldodecylamine by the Preferred Method"; Dupont Technical Information.
"Detoxication Mechanisms. II. The Iron Catalyzed Dealkylation of Trimethylamine Oxide"; Ferris et al.; Journal of the American Chemical Society/89:20/Sep. 27, 1967, pp. 5270-5275.
Kirk-Othmer, Encyclopedia of Chemical Technology, Third Edition, vol. 2, p. 259, John Wiley & Sons, New York, 1978—Amine Oxides.
"Chlorine-Resistant, Sequestering-Dispersing Agent-"—Sequion OA; Giovanni Bozzetto, pp. 10-12.

Primary Examiner—Prince Willis, Jr.
Assistant Examiner—James M. Silbermann
Attorney, Agent, or Firm—James P. Barr

[57] ABSTRACT

This invention relates to controlling scale formation in aqueous systems and more particularly to using certain calcium insensitive phosphonomethyl amine oxide compounds having at least one oxidized tertiary amine group of the formula:

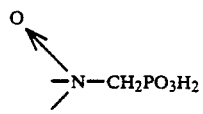

and water soluble salts thereof.

7 Claims, No Drawings

CONTROL OF SCALE IN AQUEOUS SYSTEMS USING CERTAIN PHOSPHONOMETHYL AMINE OXIDES

This is a continuation of application Ser. No. 451,681, filed Dec. 15, 1989 now abandoned.

FIELD OF THE INVENTION

This invention relates to controlling scale formation in aqueous systems and more particularly to using organic phosphonate compounds which are effective for controlling scale in aqueous systems.

BACKGROUND OF THE INVENTION

A serious problem in industrial water systems, especially in cooling water systems, industrial evaporators, and boilers is the deposition of scale, particularly scale-forming salts such as certain carbonates, hydroxides, silicates and sulfates of cations such as calcium and magnesium from aqueous solutions onto heat transfer surfaces. Much of water used in cooling water systems is supplied by the rivers, lakes, ponds, or the like and contains various amounts of scale-forming salts. In cooling tower systems, the cooling effect is achieved by evaporation of a portion of the circulating water in passing over the tower. Because of the evaporation which takes place in cooling, the solids in the water become concentrated. Moreover, because of the inverse solubility of calcium carbonate, calcium sulfate and other hardness salts, the problem of the formation of water-insoluble scales on the heat transfer surfaces is intensified.

Various organic phosphonates have been considered for use in scale control. For example, U.S. Pat. No. 3,336,221 describes a method of inhibiting the precipitation of scale-forming salts in an aqueous system comprising adding to said system compounds having a methyl phosphonic acid bonded to a nitrogen atom such as amino tri (methylphosphonic acid) or phosphonomethyl ethanolamines. Unfortunately, these compounds are not chlorine resistant and degrade in the presence of free chlorine which commonly used as a disinfectant or biocide in many aqueous systems. U.S. Pat. No. 3,214,454 teaches use of certain acylation products of phosphorous acid (e.g. hydroxyethylidene diphosphonic acid) for scale control. Unfortunately, various phosphonates including hydroxyethylidene diphosphonic acid and amino tri(methylphosphonic acid) are very sensitive to calcium hardness and prone to form calcium phosphonate precipitates.

U.S. Pat. No. 3,474,133 discloses that certain organophosphono-amine oxide compounds can be prepared by oxidizing organo-phosphono amine with a suitable oxidizing agent. For instance ethanol bis(dihydrogen phosphonomethyl) amine can be reacted with $H_2O_2$ to yield ethanol bis(dihydrogen phosphonomethyl) amine oxide (i.e. $HOCH_2CH_2N(O)(CH_2PO_3H_2)_2$); and tris(dihydrogen phosphonomethyl) amine can be reacted with $H_2O_2$ to yield tris(dihydrogen phosphonomethyl) amine oxide (i.e. $ON(CH_2PO_3H_2)_3$). It is disclosed that the organo-phosphono amine oxides have utility in practically all fields of organic chemistry wherein their acidic or salt and/or amine oxide properties can be utilized; and the various utilities indicated for the compounds in such fields include utility as sequestering or chelating agents, water treating agents, stabilizers for peroxy compounds and corrosion inhibitors. In particular, the acids and water soluble salts of the tris(phosphono lower alkylidene) amine oxides are reported to exhibit the property of being effective sequestering agents for metal ions in alkaline mediums. For example, the penta sodium salt of tris(dihydrogen phosphonomethyl) amine oxide is reported to sequester calcium ions in alkaline media in over a mole per mole basis. These tri(phosphono lower alkylidene) amine oxide compounds are considered very sensitive to calcium hardness and they are prone to form calcium phosphonate precipitates.

There is a continuing need for safe and effective water treating agents which can be used to control scale formation, or to control corrosion particularly when substantial calcium is present in the system water. Water treating agents of this type are especially valuable if they remain stable in the presence of free chlorine which is commonly used in aqueous systems as a biocide or disinfectant.

SUMMARY OF THE INVENTION

We have found that the formation of scale in an aqueous system can be effectively inhibited by adding to the system water a calcium insensitive water-soluble phosphonomethyl amine oxide having at least one oxidized tertiary amine group of the formula:

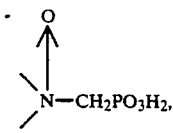

or a water-soluble salt thereof.

These compounds include calcium insensitive water-soluble phosphonomethyl amine oxides having the formula:

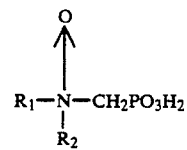

wherein either $R_1$ is selected from hydrocarbyl, and hydroxy-substituted, alkoxy-substituted, carboxyl-substituted, or sulfonyl-substituted hydrocarbyls; and $R_2$ is selected from hydrocarbyl, hydroxy-substituted, alkoxy-substituted, carboxyl-substituted, and sulfonyl-substituted hydrocarbyls,

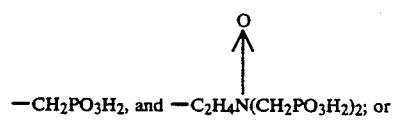

$R_1$ and $R_2$ together form an alicyclic ring having 3 to 5 carbon atoms optionally along with oxygen and/or phosphorus atoms in the ring, and water-soluble salts thereof.

It is an object of this invention to provide scale control in aqueous systems.

It is another object of this invention to provide scale control using an agent which is considered calcium insensitive.

It is yet another object of this invention to provide scale control using an agent which is resistant to free chlorine in water.

These and other objects and advantages of the present invention will become apparent from the detailed description of the invention which follows.

DETAILED DESCRIPTION

This invention relates to certain calcium insensitive phosphonomethyl amine oxide compounds and their use as scale control agents for treating aqueous systems. Calcium sensitivity refers to the tendency of a compound to precipitate with calcium ions in solution. Calcium insensitivity is considered an important feature of this invention because it allows the agents of this invention to be used effectively in water of relatively high hardness. The test for calcium insensitivity of a compound as used in this application involves a cloud point test where the compound is added to a hard water containing 500 ppm calcium ion (as $CaCO_3$) which is buffered at pH 8.3 using 0.005M borate buffer and has a temperature of 60° C. The amount of compound which can be added until the solution becomes turbid (the cloud point) is considered to be an indicator of calcium sensitivity. This cloud point test will be referred to herein as the "CA500 cloud point test". The calcium insensitive compounds of this invention have cloud points of at least about 25 ppm as determined by the CA500 cloud point test. Preferred compounds have a cloud point of at least about 50 ppm; and the most preferred compounds have a cloud point of at least about 75 ppm as determined by the CA500 cloud point test because they are considered particularly versatile with regard to the water systems in which they can be effectively used.

Not all organo phosphonates, nor even all organo phosphono amine oxide compounds, exhibit calcium insensitivity. The compounds of this invention are water-soluble phosphonomethyl amine oxides having at least one oxidized tertiary amine group of the formula:

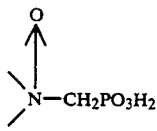

(and water-soluble salts thereof) which are calcium insensitive (i.e. have CA500 cloud points of at least about 25 ppm). This includes calcium insensitive phosphonomethyl amine oxide compounds having the formula:

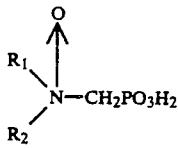

wherein either $R_1$ is selected from hydrocarbyl, hydroxy-substituted hydrocarbyl, alkoxy-substituted hydrocarbyl, carboxy-substituted hydrocarbyl, and sulfonyl-substituted hydrocarbyl; and $R_2$ is selected from hydrocarbyl, hydroxy-substituted hydrocarbyl, alkoxy-substituted hydrocarbyl, carboxy-substituted hydrocarbyl, sulfonyl-substituted hydrocarbyl, $-CH_2PO_3H_2$, and $-C_2H_4N(O)(CH_2PO_3H_2)_2$; or $R_1$ and $R_2$ together form an alicyclic ring having 3 to 5 carbon atoms optionally along with oxygen atoms, phosphorus atoms or both oxygen and phosphorus atoms in the ring, and water-soluble salts of said phosphonomethyl amine oxides.

Hydrocarbyl includes alkyl, aryl and alkaryl groups which do not render the amine oxide insoluble in water. Examples of hydrocarbyl groups are alkyl groups having from 1 to about 6 carbon atoms such as methyl, ethyl and cyclohexyl groups. Examples of hydroxy substituted hydrocarbyl groups are hydroxy substituted alkyl groups having from 1 to about 6 carbon atoms such as hydroxyethyl and hydroxyisopropyl groups. Examples of alkoxy-substituted hydrocarbyl groups are hydroxyalkyl groups having from 1 to about 6 carbon atoms which are alkoxylated with one to four units of ethylene oxide or propylene oxide such as a hydroxyethoxy ethyl group. Examples of carboxy-substituted hydrocarbyl are alkyl groups having from 1 to about 4 carbons which are substituted with a carboxylic acid group such as a carboxymethyl group. Examples of sulfonyl-substituted hydrocarbyl are sulfonyl-substituted alkyl groups having from 1 to about 4 carbon atoms such as a sulfonyl ethyl group. Examples of alicyclic rings formed by $R_1$ and $R_2$ together are rings where $R_1$ and $R_2$ together form the sequences $-CH_2CH_2OP(O)(OH)CH_2-$ or $-CH_2CH_2OCH_2CH_2-$.

Examples of the calcium insensitive water-soluble phosphonomethyl amine oxides are N,N-bis-phosphonomethyl ethanolamine N-oxide (i.e. $R_1$ is $-CH_2C-H_2OH$ and $R_2$ is $-CH_2PO_3H_2$); N,N-bis-phosphonomethyl ethylamine N-oxide (i.e., $R_1$ is $-C_2H_5$ and $R_2$ is $-CH_2PO_3H_2$); N,N-bis-phosphonomethyl hydroxyethoxy ethylamine N-oxide (i.e. $R_1$ is $-CH_2C-H_2OCH_2CH_2OH$ and $R_2$ is $-CH_2PO_3H_2$); N,N-bis-phosphonomethyl taurine N-oxide (i.e. $R_1$ is $-CH_2CH_2SO_3H$ and $R_2$ is $-CH_2PO_3H_2$); N,N-bis-phosphonomethyl glycine N-oxide (i.e. $R_1$ is $-CH_2COOH$ and $R_2$ is $-CH_2PO_3H_2$); phosphonomethyl iminodiacetic acid N-oxide (i.e. $R_1$ is $-CH_2COOH$ and $R_2$ is $-CH_2COOH$); phosphonomethyl diethanolamine N-oxide ( i.e. $R_1$ is $-CH_2CH_2OH$ and $R_2$ is $-CH_2C-H_2OH$); 4-phosphonomethyl-2-hydroxy-2-oxo1,4,2-oxazaphosphorinane N-oxide (i.e. $R_1$ and $R_2$ together form an alicylic ring having $-CH_2CH_2OP(O)(OH)C-H_2-$; N,N,N'-tri-phosphonomethyl, N'-hydroxyethyl ethylene diamine N,N'-dioxide (i.e. $R_1$ is $-CH_2CH_2OH$ and $R_2$ is $-C_2H_4N(O)(CH_2PO_3H_2)_2$. Novel phosphonomethyl amine oxide compounds disclosed herein are considered to include N,N-bis-phosphonomethyl 2-(hydroxyethoxy) ethylamine N-oxide, 4-(phosphonomethyl) 2-hydroxy-2-oxo-1,4,2-oxazaphosphorinane N-oxide, and N,N-bis-phosphonomethyl taurine N-oxide (and their water soluble salts).

The calcium insensitive phosphonomethyl amine oxides may be prepared by conventional oxidation of the trisubstituted nitrogen of the corresponding tertiary amine with a suitable oxidizing agent. Suitable oxidizing agents are generally oxidizing agents which contain an O—O linkage (peroxide compound) and have oxidizing action. Suitable oxidizing agents are considered to include hydrogen peroxide, substituted peroxides and additional compounds of hydrogen peroxide such as the peroxide of sodium and the peroxide of potassium, urea percompounds, percarbonates, perborates, persulfates and the peracids such as persulfuric acid, peracetic acid, peroxymonophosphoric acid and the like as well as their water-soluble salt compounds such as sodium, potassium, ammonium and organic amine salts. In general, the oxidation process is usually carried out in an aqueous medium.

Hydrogen peroxide is the preferred oxidizing agent. Reference is made to Hoh et al. "Hydrogen Peroxide Oxidation of Tertiary Amines", The Journal of the American Oil Chemists' Society, Vol. LV, No. 7, pp 268–271 (July 1963) and Lake et al. "Recent Advances in Fatty Amine Oxides. Part I. Chemistry and Preparation", The Journal of the American Oil Chemists' Society, Vol. 40, No. 11, pp. 628–631 (November 1963) for discussion of such oxidations. In general, a solution of the tertiary amine may be advantageously reacted at a pH of about 10 with about 20% excess hydrogen peroxide. It is preferred to use concentrations of hydrogen peroxide above about 2% by weight of the reaction medium.

The water soluble salts are readily prepared from the phosphonomethyl amine oxides by neutralizing the phosphonic acid group (and other acid groups) with a stoichiometric amount of a base or salt that contains essentially the desired cation or by conversion of phosphonomethyl amine to a salt form prior to its oxidation to the amine oxide. Bases and salts of acids such as those containing an alkali metal, alkaline earth metal, zinc, aluminum, ammonia and amines such as lower alkyl amines are especially suited, with sodium and potassium salts being preferred. For example, to make a sodium salt, a free acid of the phosphonomethyl amine oxide can be neutralized with a stoichiometric amount of a base containing sodium cation, such as sodium hydroxide. It is noted that all of the acid hydrogens of the phosphonomethyl amine oxides need not be replaced nor need the cation be the same for each acid hydrogen replaced. Thus the cation may be any one of, or a mixture of, $NH^+_4$, $H^+$, $Na^+$, $K^+$, etc.

Other bases or salts which can be reacted with the free acids to produce salt compounds of the instant invention include the inorganic alkali metal salts, oxides and hydroxides such as $Na_2O$, $Na_2CO_3$, $KOH$, $K_2O$, $K_2CO_3$, $LiOH$, $Li_2CO_3$, $CsOH$, $Cs_2CO_3$, other inorganic salts, and hydroxides such as $Al(OH)_3$, $Al_2(SO_4)_3$, $Al(NO_3)_3$ and $ZnSO_4$ and amines, particularly low molecular weight amines (i.e. amines having a molecular weight below about 300), and more particularly the alkyl amines, alkylene amines and alkanol amines containing not more than 2 amine groups such as ethyl amine, diethylamine, propyl amine, propylene diamine, hexylamine, 2-ethyl hexylamine, N-butylethanol amine, triethanolamine and the like.

For the foregoing methods of preparation, reaction conditions such as temperatures, pH and time for reaction can be varied with the optimum conditions for the reactions being readily ascertained by those skilled in the art. Reference is made to U.S. Pat. No. 3,429,914, which is hereby incorporated herein in its entirety by reference, for a discussion of the preparation of organo-phosphono amines and organo-phosphono-amine oxides.

The tertiary phosphonomethyl amine, N,N-bis-phosphonomethyl taurine which is useful as a reagent for preparing some of the compounds of the instant invention can be prepared by the known reaction of a nitrogenous material (i.e. taurine; $H_2N-CH_2CH_2SO_3H$) with a compound containing a carbonyl group (i.e. formaldehyde) and orthophosphorous acid. Reference is made to U.S. Pat. No. 4,216,163 which is hereby incorporated herein in its entirety by reference, for guidance in reacting imino bis-methane phosphonic acid, sodium hydroxide and sodium isethionite to yield a corresponding product.

As other examples of phosphonomethyl amine preparation, N-phosphonomethyl iminodiacetic acid may be prepared by reacting phosphorous acid with paraformaldehyde and iminodiacetic acid; N,N-bis-phosphonomethyl 2-(hydroxyethoxy) ethylamine may be prepared by reacting 2-(hydroxyethoxy) ethylamine with phosphorous acid and formaldehyde; N,N-bis-phosphonomethyl ethylamine may be prepared by reacting ethylamine with phosphorous acid and formaldehyde; and 4-(phosphonomethyl)-2-hydroxy-2-oxo-1,4,2-oxazaphosphorinane may be prepared by reacting ethanolamine with phosphorous acid and formaldehyde.

These calcium insensitive water-soluble phosphonomethyl amine oxide compounds have been found to be effective for inhibiting the deposit of scale in aqueous systems, including in particular the deposit of scale derived from the system water and containing calcium carbonate, calcium sulfate, calcium phosphates, calcium silicates, magnesium carbonate, magnesium silicate, magnesium phosphate and/or iron oxide, on the metallic structures of industrial water systems. Their use in controlling the deposit of calcium carbonate scale in cooling water systems is considered particularly advantageous. The phosphonomethyl amine oxide compounds are also effective when used in water at high temperatures and pressures in steam generating boilers and remain soluble in water containing substantial hardness and alkalinity. The invention exhibits the threshold effect of the inhibition of formation of scale forming salt crystals and the inhibition of their adherence to heat transfer surfaces at low treatment levels.

In accordance with this invention the formation of scale in aqueous systems may be inhibited by adding an effective amount of the calcium insensitive water-soluble phosphonomethyl amine oxides of this invention (or their water soluble salts) to the system water. The phosphonomethyl amine oxides and their soluble alkali metal salts (usually the sodium salts) are preferred for this purpose.

Organophosphono amine oxide compounds are considered relatively stable in aqueous solution in the presence of free chlorine, especially when compared to corresponding organophosphono amine compounds. Use of the calcium insensitive phosphonomethyl amine oxide compounds in accordance with this invention is thus particualrly advantageous in connection with aqueous systems in which free chlorine is present. Thus, for example the calcium insensitive phosphonomethyl amine oxide compounds of this invention might be particularly useful as scale control agents for aqueous systems (e.g. cooling water systems) where chlorine gas or a hypochlorite salt is being added as a biocide.

The precise dosage of phosphonomethyl amine oxide or salt thereof depends, to some extent, on the nature of the aqueous system in which it is to be incorporated and the degree of protection desired. In general, however, it can be said the concentration maintained in the system water can be from about 0.001 to about 1000 ppm. Within this range, generally low dosages of about 200 ppm or less are normally preferred, with a dosage of about 50 ppm of less being most preferred for many aqueous systems (e.g. many open recirculating cooling water systems). Typically dosages of about 0.05 ppm or more are preferred, with a dosage of about 0.5 ppm or more being most preferred. For most applications use of a substoichiometric amount is contemplated (i.e. less than the amount required to sequester scale-forming cations such as calcium).

The exact amount required with respect to a particular aqueous system can be readily determined in conventional manners and/or estimated from the alkalinity, pH, calcium concentration, dissolved solids, and water temperature in the systems.

The phosphonomethyl amine oxide or salt thereof may be added to the system water by any convenient mode, such as by first forming a concentrated solution of the phosphonomethyl amine oxide or salt with water (preferably containing between 1 and 50 total weight percent of the phosphonomethyl amine oxides) and then feeding the concentrated solution to the system water at some convenient point in the system. In many instances the compounds may be added to the make-up or feed water lines through which water enters the system. For example, an injector calibrated to deliver a predetermined amount periodically or continuously to the make-up water may be employed.

The present invention is especially useful in the treatment of cooling water systems which operate at temperatures between about 60° F. and 200° F., particularly open recirculating cooling water systems which operate at temperatures of from about 80° F. to 150° F. The phosphonomethyl amine oxides of this invention are also considered useful in treating the feed water or make-up water in a steam generating boiler. Such boiler systems are generally operated at a temperature of from about 298° to about 700° F. and a pressure of from about 50 to 3000 psig. The calcium insensitive phosphonomethyl amine oxides of this invention are also considered effective corrosion control agents. Reference is made to U.S. patent application No. [07/451,674] for further discussion of corrosion control using certain phosphonomethyl amine oxides.

It will be appreciated that while the phosphonomethyl amine oxides of this invention may be used as the sole scale inhibitor for an aqueous system, other ingredients customarily employed in aqueous systems of the type treated herein can be used in addition to the subject phosphonomethyl amine oxides. Other water treatment additives include, for example, many biocides, polymeric agents (e.g. copolymers of 2-acrylamido-2-methyl propane sulfonic acid and methacrylic acid or polymers of acrylic or methacrylic acid), other phosphonates, yellow metal corrosion inhibitors (e.g. benzotriazole), other corrosion inhibitors, and the like.

Practice of the invention will become further apparent from the following non-limiting examples.

EXAMPLE I

Calcium sensitivities for the phosphonomethyl amine oxides, N,N-bis-phosphonomethyl-2-(hydroxyethoxy) ethylamine N-oxide, 4-(phosphonomethyl)-2-hydroxy-2-oxo-1,4,2-oxazaphosphorinane N-oxide, N,N-bis-phosphonomethyl taurine N-oxide, N,N-bis-phosphonomethyl glycine N-oxide, N-phosphonomethyl iminodiacetic acid N-oxide, N,N-bis-phosphonomethyl ethanolamine N-oxide and N,N-bis-phosphonomethyl ethylamine N-oxide were respectively tested by the above-described CA500 cloud point test procedure.

In the test the phosphonomethyl amine oxides were respectively added to a 250-ml beaker containing hard water solutions having a temperature of 60° C., having a pH of 8.3, and containing 500 ppm calcium ion (as $CaCO_3$) and 0.005M borate buffer. In the runs for N,N-bis-phosphonomethyl-2-(hydroxyethoxy)ethylamine N-oxide, 4-(phosphonomethyl)-2-hydroxy-2-oxo-1,4,2-oxazaphosphorinane N-oxide, N,N-bis-phosphonomethyl taurine N-oxide and N,N-bis-phosphonomethyl ethylamine N-oxide, 100 ppm of each of the phosphonomethyl amine N-oxides was added without reaching the cloud point. In the case of N-phosphonomethyl iminodiacetic acid N-oxide a cloud point was reached at about 38 ppm. In the case of N,N-bis-phosphonomethyl glycine N-oxide a could point was reached at about 30 ppm. In the case of N,N-bis-phosphonomethyl ethanolamine N-oxide, 80 ppm was added without reaching the cloud point. For comparison, runs were made using amino tri(methylphosphonic acid), amino tri(methylphosphonic acid) N-oxide and hydroxyethylidene diphosphoric acid, none of which is considered a calcium insensitive compound of the present invention. The results are shown in Table A below.

TABLE A

| Run | Additive | Cloud Point (ppm) |
|-----|----------|-------------------|
| 1 | N,N-Bis-phosphonomethyl-2-(hydroxyethoxy) ethylamine N-oxide | >100 |
| 2 | 4-(Phosphonomethyl)-2-hydroxy-2-oxo-1,4,2-oxazaphosphorinane N-oxide | >100 |
| 3 | N,N-Bis-phosphonomethyl taurine N-oxide | >100 |
| 4 | N,N-Bis-phosphonomethyl ethylamine N-oxide | >100 |
| 5 | N-Phosphonomethyl iminodiacetic acid N-oxide | 38 |
| 6 | N,N-Bis-phosphonomethyl glycine N-oxide | 30 |
| 7 | N,N-Bis-phosphonomethyl ethanolamine N-oxide | >80 |
| 8 | Amino tri(methylphosphonic acid) | 10 |
| 9 | Amino tri(methylphosphonic acid) N-oxide | 5 |
| 10 | Hydroxyethylidene diphosphonic acid | 7 |

EXAMPLE II

The ability of the calcium insensitive phosphonomethyl amine oxides, N-phosphonomethyl iminodiacetic acid N-oxide, N,N-bis-phosphonomethyl-2-(hydroxyethoxy) ethylamine N-oxide, 4-(phosphonomethyl)-2-hydroxy-2-oxo-1,4,2-oxazaphosphorinane N-oxide, N,N-bis-phosphonomethyl glycine N-oxide, N,N-bis-phosphonomethyl taurine N-oxide, N,N-bis-phosphonomethyl ethanolamine N-oxide and N,N-bis-phosphonomethyl ethylamine N-oxide to inhibit calcium carbonate formation was measured using a threshold inhibitor test. In this test 800 ml of a test solution containing 400 ppm calcium (as Ca) and 400 ppm bicarbonate (as $HCO_3$) in a 1000 ml beaker was stirred with a magnetic stir bar and heated using a stainless steel immersion heater to 49° C. The pH was monitored during heating and kept at pH 7.15 with addition of dilute HCl. After the temperature of 49° C. was achieved, 0.1N NaOH was added to the test solution at a rate of 0.32 ml/min using a syringe pump and the rise in pH was monitored. A decrease or plateau in the rate of pH increase is observed when calcium carbonate starts to precipitate, and the pH at which this decrease or plateau is observed is termed the critical pH. The critical pH for the test solution is shown in Table B below along with the total milliequivalents per liter of hydroxide (as NaOH) added to reach the critical pH.

The procedure was repeated using test solutions to which 5 ppm of the respective calcium insensitive phosphonomethyl amine oxide was added. A run was also made using amino tri(methylphosphonic acid) N-oxide. The results are shown in Table B below.

TABLE B

| Run | Additive | Critical pH | NaOH added to reach critical pH (meq/l) |
|---|---|---|---|
| 1 | Blank (without treatment) | 7.69 | 0.48 |
| 2 | N-Phosphonomethyl iminodiacetic acid N-oxide | 8.66 | 2.01 |
| 3 | N,N-Bis-phosphonomethyl-2-(hydroxyethoxy) ethylamine N-oxide | 8.96 | 2.78 |
| 4 | 4-(Phosphonomethyl)-2-hydroxy-2-oxo-1,4,2-oxazaphosphorinane N-oxide | 8.55 | 1.52 |
| 5 | N,N-Bis-phosphonomethyl glycine N-oxide | 8.74 | 2.24 |
| 6 | N,N-Bis-phosphonomethyl taurine N-oxide | 8.89 | 2.49 |
| 7 | N,N-Bis-phosphonomethyl ethanolamine N-oxide | 8.91 | 2.50 |
| 8 | N,N-Bis-phosphonomethyl ethylamine N-oxide | 8.89 | 2.92 |
| 9 | Amino tri(methylphosphonic acid) N-oxide | 8.50 | 1.34 |

As shown in Table B, use of the phosphonomethyl amine oxides of the present invention raised the critical pH and generally resulted in substantially more sodium hydroxide addition before the critical pH was reached. These phosphonomethyl amino oxides are thus effective threshold inhibitors, capable of inhibiting calcium carbonate precipitation.

EXAMPLE III

Scale formation was further tested using an apparatus comprising a covered 28-liter basin, a centrifugal pump which withdraws liquid from the bottom of the basin and circulates it through tubing respectively to a needle valve which allows flow control, a flow meter which allows flow measurement, a glass housing containing an immersion heater for heating the liquid which is returned to the basin. A cooling coil is provided in the basin and is connected such that tap water may be circulated through the cooling coil. The liquid temperature is controlled using a thermoregulator which activates a solenoid valve which controls the flow of tap water through the coil. A pH probe is also located in the basin and is operably connected to a pH controller which in turn controls a pair of solenoid valves which respectively control flow of 0.5N NaOH and 0.2N H₂SO₄ from 1-liter containers to the basin.

Five liters of test solution containing 600 ppm total hardness (as CaCO₃) was transfered to the basin and circulated at a flow rate of 1.4 ft. per second using the centrifugal pump. The pH was controlled within the range of 8.0-8.2 and the variable transformer was turned on such that the heat flux for the immersion heater was 10.9 KBTU per square foot per hour. The cooling coil was operated such that the outlet water from the basin was controlled at 60° C. After six hours the power transformer and the pH controller were turned off and the pH probe was removed from the basin. The water in the basin was cooled rapidly by resetting the thermoregulator to provide tap water circulation through the cooling coil. A sample of test solution was removed from the basin when it had cooled to 35° C., and it was analyzed for total hardness. The results are shown in Table C below. The reduction in total hardness was considered indicative of the scale formation in the system.

The run was repeated using the above procedure except that 2 ppm N,N-bis-phosphonomethyl glycine N-oxide, a calcium insensitive phosphonomethyl amine oxide was added to the test solution prior to heating; another run was made using 2 ppm N,N-bis-phosphonomethyl ethanolamine N-oxide; and another run was made using 10 ppm N-phosphonomethyl iminodiacetic acid N-oxide; another run was made using 2 ppm N,N-bis-phosphonomethyl-2-(hydroxyethoxy)ethylamine N-oxide; another run was made using 10 ppm 4-(phosphonomethyl)-2-hydroxy-2-oxo-1,4,2-oxazaphosphorinane N-oxide; and another run was made using 2 ppm N,N-bis-phosphonomethyl taurine N-oxide. The total hardness of the test solution at the conclusion of these runs are shown in Table C below, as is the reduction in total hardness, and the calculated inhibition of scale formation.

TABLE C

| | | Test Solution Total Hardness (ppm) | | | Calculated Scale Inhibition |
|---|---|---|---|---|---|
| Run | Additive | Start | End | Change | % |
| 1 | Blank (without treatment) | 600 | 134 | 466 | — |
| 2 | N,N-Bis-phosphonomethyl glycine N-oxide (2 ppm) | 600 | 595 | 5 | 98.9 |
| 3 | N,N-Bis-phosphonomethyl ethanolamine N-oxide (2 ppm) | 600 | 590 | 10 | 97.9 |
| 4 | N-Phosphonomethyl iminodiacetic acid N-oxide (10 ppm) | 600 | 583 | 17 | 96.4 |
| 5 | N,N-Bis-phosphonomethyl 2-(hydroxyethoxy)ethylamine N-oxide (2 ppm) | 600 | 580 | 20 | 95.7 |
| 6 | 4-(Phosphonomethyl)-2-hydroxy-2-oxo-1,4,2-oxazaphosphorinane N-oxide (10 ppm) | 600 | 596 | 4 | 99.1 |
| 7 | N,N-Bis-phosphonomethyl taurine N-oxide (2 ppm) | 600 | 599 | 1 | 99.8 |

EXAMPLE IV

N,N-bis-phosphonomethyl ethanolamine N-oxide was tested for inhibiting calcium carbonate scale using the hot surface scale tester. The threshold stress tests were conducted using 600 ppm total hardness (as CaCO₃) water at 60° C. with continuous addition of 50 ml of 0.1N sodium hydroxide at 0.27 ml per minute. The scale inhibitive activity of N,N-bis-phosphonomethyl ethanolamine N-oxide was evident. At the end of the 6-hour test, the amount of the deposit on the heating surface was found to be 0.201 gram when treated by 10 ppm N,N-bis-phosphonomethyl ethanolamine N-oxide. This compares to 0.489 gram deposit for a blank run without treatment.

EXAMPLE V

A two ppm solution of N,N-bis-phosphonomethyl ethanolamine N-oxide in zero hardness water was heated for 24 hours at 60° C. The amount of organic phosphonate which was converted to orthophosphate was then determined. Additional runs (runs 2 and 3) were made using the same solution except that 10 ppm and 20 ppm of NaOCl were respectively added prior to heating. The results are shown in Table D below. Series of runs were also made using 2 ppm 4-(phosphonomethyl)-2-hydroxy-2-oxo-1,4,2-oxazaphosphorinane N-oxide (runs 4, 5 and 6), 2 ppm N,N-bis-phosphonomethyl glycine N-oxide (runs 7, 8 and 9), 2 ppm N,N-bis-phosphonomethyl-2-(hydroxyethoxy) ethylamine N-oxide (runs 10, 11 and 12), 2 ppm N,N-bis-phosphonomethyl taurine N-oxide (runs 13, 14 and 15), and 2 ppm N,N-bis-phosphonomethyl ethylamine N-oxide (runs 16, 17 and 18) respectively, rather than N,N-bis-phosphonomethyl ethanolamine N-oxide.

For comparison, a like series of runs (runs 19, 20 and 21) was made using a 2 ppm solution of N,N-bis-phosphonomethyl ethanolamine rather than N,N-bis-phosphonomethyl ethanolamine N-oxide. Also for comparison, a like series of runs (runs 22, 23 and 24) was made using a 2 ppm solution of amino tri(methylphosphonic acid). The results are also shown in Table D below.

TABLE D

| Run | Additive | NaOCl Added (ppm) | % Conversion |
|---|---|---|---|
| 1 | N,N-Bis-phosphonomethyl ethanolamine N-oxide | 0 | 1.2 |
| 2 | N,N-Bis-phosphonomethyl ethanolamine N-oxide | 10 | 17.2 |
| 3 | N,N-Bis-phosphonomethyl ethanolamine N-oxide | 20 | 18.0 |
| 4 | 4-(Phosphonomethyl)-2-hydroxy-2-oxo-1,4,2-oxazaphosphorinane N-oxide | 0 | 0.2 |
| 5 | 4-(Phosphonomethyl)-2-hydroxy-2-oxo-1,4,2-oxazaphosphorinane N-oxide | 10 | 1.0 |
| 6 | 4-(Phosphonomethyl)-2-hydroxy-2-oxo-1,4,2-oxazaphosphorinane N-oxide | 20 | 1.0 |
| 7 | N,N-Bis-phosphonomethyl glycine N-oxide | 0 | 1.4 |
| 8 | N,N-Bis-phosphonomethyl glycine N-oxide | 10 | 19.0 |
| 9 | N,N-Bis-phosphonomethyl glycine N-oxide | 20 | 19.4 |
| 10 | N,N-Bis-phosphonomethyl-2-(hydroxyethoxy) ethylamine N-oxide | 0 | 0.4 |
| 11 | N,N-Bis-phosphonomethyl-2-(hydroxyethoxy) ethylamine N-oxide | 10 | 4.6 |
| 12 | N,N-Bis-phosphonomethyl-2-(hydroxyethoxy) ethylamine N-oxide | 20 | 5.4 |
| 13 | N,N-Bis-phosphonomethyl taurine N-oxide | 0 | 5.8 |
| 14 | N,N-Bis-phosphonomethyl taurine N-oxide | 10 | 13.6 |
| 15 | N,N-Bis-phosphonomethyl taurine N-oxide | 20 | 14.7 |
| 16 | N,N-Bis-phosphonomethyl ethylamine N-oxide | 0 | 0.7 |
| 17 | N,N-Bis-phosphonomethyl ethylamine N-oxide | 10 | 9.3 |
| 18 | N,N-Bis-phosphonomethyl ethylamine N-oxide | 20 | 9.3 |
| 19 | N,N-Bis-phosphonomethyl ethanolamine | 0 | 4.5 |
| 20 | N,N-Bis-phosphonomethyl ethanolamine | 10 | 100.0 |
| 21 | N,N-Bis-phosphonomethyl ethanolamine | 20 | 100.0 |
| 22 | Amino tri(methylphosphonic acid) | 0 | 3.7 |
| 23 | Amino tri(methylphosphonic acid) | 10 | 93.0 |
| 24 | Amino tri(methylphosphonic acid) | 20 | 93.0 |

The Examples encompass particular embodiments of the invention. Other embodiments will become apparent to those skilled in the art from a consideration of the specification or practice of the invention disclosed herein. It is understood that modifications and variations may be produced without departing from the spirit and scope of the novel concepts of this invention. It is further understood that the invention is not confined to the particular formulations and examples herein illustrated, but it embraces such modified forms thereof a come within the scope of the following claims.

What is claimed is:

1. A process for inhibiting the formation of scale in an aqueous system comprising the step of incorporating into the system water a water soluble calcium insensitive phosphonomethyl amine oxide having at least one oxidized tertiary amine group of the formula:

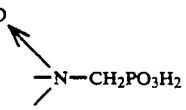

and having a cloud point of at least about 25 ppm as determined by the CA500 cloud point test or a water soluble salt of said phosphonomethyl amine oxide in an amount effective to inhibit the formation of scale.

2. The process of claim 1 wherein the phosphonomethyl amine oxide or an alkali metal salt thereof are added to the system water.

3. The process of claim 1 wherein the phosphonomethyl amine oxide has a cloud point of at least about 50 ppm as determined by the CA500 cloud point test.

4. The process of claim 1 wherein the phosphonomethyl amine oxide is selected from those having the formula:

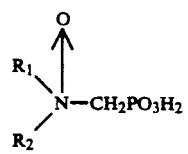

wherein either $R_1$ is selected from hydrocarbyl, and hydroxy-substituted, alkoxy-substituted, carboxyl-substituted, and sulfonyl-substituted hydrocarbyl; and $R_2$ is selected from hydrocarbyl, hydroxy-substituted, alkoxy-substituted, carboxyl-substituted, sulfonyl-substituted hydrocarbyl,

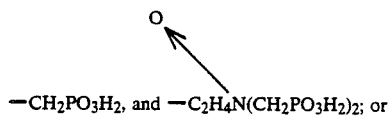

$R_1$ and $R_2$ together form an alicyclic ring having 3 to 5 carbon atoms in the ring.

5. The process of claim 1 wherein the phosphonomethyl amine oxide is selected from the group consisting of N,N-bis-phosphonomethyl ethanolamine N-oxide, N,N-bis-phosphonomethyl-2-(hydroxyethoxy) ethylamine N-oxide, N,N-bis-phosphonomethyl glycine N-oxide, N-phosphonomethyl iminodiacetic acid N-oxide, N,N-bis-phosphonomethyl taurine N-oxide and N,N-bis-phosphonomethyl ethylamine N-oxide and their water soluble salts.

6. The process of claim 1 wherein the phosphonomethyl amine oxide is N,N-bis-phosphonomethyl ethanolamine N-oxide or its water soluble salts.

7. The process of claim 1 wherein the phosphonomethyl amine oxide is 4-(phosphonomethyl)-2-hydroxy-2-oxo-1,4,2-oxazaphosphorinane N-oxide or its water soluble salts.

* * * * *